United States Patent Office 3,438,747
Patented Apr. 15, 1969

3,438,747
NOVEL BORON CONTAINING COMPOUNDS AND
PROCESS FOR THEIR PREPARATION
Walter R. Hertler, Wilmington, Del., assignor to E. I. du
Pont de Nemours and Company, Wilmington, Del., a
corporation of Delaware
No Drawing. Filed Sept. 27, 1965, Ser. No. 490,661
Int. Cl. C01b *35/00, 6/22;* C07f *5/02*
U.S. Cl. 23—315                                   7 Claims

ABSTRACT OF THE DISCLOSURE

The reaction of decaborane with a sulfur diimine results in the formation of $B_{10}H_{11}S^-$ anions. The acid, alkali metal, alkaline earth metal and ammonium salts are disclosed. The compounds are useful reducing agents. By calcination the compounds form resistive elements. Copolymers with isocyanides can also be made.

---

Description of the invention

This invention relates to novel boron-containing compounds and processes for their preparation. More particularly, the invention concerns polyboron compounds containing a cation and an anion having a framework of 10 boron atoms surrounding a centrally located sulfur atom.

The novel compounds can be represented by the formula (1)         $MB_{10}H_{11}S$ wherein M is hydrogen, alkali metal, one equivalent of an $GNH_3^+$, $GG'NH_2^+$, $GG_2'NH^+$, $GG_3'N^+$, $G_4P^+$, $G_3S^+$, $G_4As^+$, or $G_4Sb^+$, wherein G is aliphatically saturated hydrocarbyl, and G' is aliphatically saturated hydrocarbyl bonded to N through aliphatic carbon. Preferably G and G' each contain up to 18 carbon atoms and most preferably up to 12 carbons. Any two G and G' groups in the same cation can also be joined (bonded) to each other directly or through an ethereal oxygen atom to form a divalent aliphatically saturated hydrocarbon group or oxygen-interrupted (mono-oxa) hydrocarbon group of up to 18 carbon atoms and preferably of up to 12 carbons. Most preferably, this divalent group is an alkylene radical of 4–8 carbons. "Aliphatically saturated hydrocarbyl" is defined as a hydrocarbyl group that does not contain any aliphatic unsaturation, i.e., the hydrocarbyl groups can be alkyl, cycloalkyl, aryl, alkaryl or aralkyl.

Examples of the above cations include methylammonium, cyclopropylammonium, 1-methylheptylammonium, 2-(1-naphthyl)ethylammonium, octadecylammonium, p-ethylanilinium, diisobutylammonium, dicyclohexylammonium, dinonylammonium, morpholinium, dodecamethyleniminium, triisopropylammonium, N-methylpiperidinium, trihexylammonium, dodecyldimethylammonium, tetraisopentylammonium, heptyltrimethylammonium, trimethylpentylammonium, cyclodecyltrimethylammonium, tetramethylphosphonium, tetranaphthylphosphonium, ethylpentamethylene-p-tolylphosphonium, dimethyloctadecylsulfonium, methyltetramethylenesulfonium, triethylsulfonium, tetraphenylarsonium, benzylhexadecyldimethylarsonium, dodecyltriethylarsonium, tetramethylstibonium, N,N-didodecylmorpholinium, dibenzyldimethylstibonium, and the like.

Of the above G and G'-substituted cations, the ammonium, phosphonium and sulfonium are preferred because of availability. For the same reason, those containing only lower alkyl (1–8 carbon atoms) are preferred.

The $B_{10}H_{11}S^-$ moiety is an anion consisting of ten B–H units believed to be arranged in an adamantane-like boron cage or near-cage type structure. The eleventh hydrogen is probably present either in a bridging position or in a $BH_2$ group. The sulfur atom is believed to be located in the center of the B-H array and bonded either to the six non-bridgehead boron atoms or to the four bridgehead boron atoms.

The novel products of this invention can be prepaperd by reacting decaborane (14) with a sulfur diimine of the formula RN=S=NR wherein R is alkyl of 4–12 carbon atoms or aryl of 6–10 carbon atoms. The reaction is carried out at temperatures ranging from —25° to 50° C., room temperatures being preferred for convenience. Neither pressure nor time of reaction is critical. Atmospheric pressure is generally employed for convenience. The reaction is normally carried out in the presence of a solvent, preferably an ether and most preferably a dialkyl ether of 2 to 10 carbon atoms or a cyclic aliphatic hydrocarbon ether, such as dioxane, tetrahydrofuran, and the like. Aromatic hydrocarbons, e.g., benzene or xylene, or esters, e.g. ethyl acetate can also be employed as solvents.

The novel products can also be prepared from an N-thionitrosodialkylamine and decaborane (14) according to the equation (2)         $R'_2NN=S+B_{10}H_{14} \rightarrow B_{10}H_{11}S^-$ 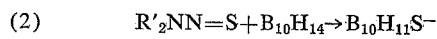

where each R' is alkyl of up to 12 carbons or together are an alkylene group of 2–12 carbons. The reaction is carried out at temperatures ranging from —25° to 100° C., preferably 30–40° C., in an inert solvent. Neither pressure nor time of reaction is critical. Atmospheric pressure is preferred for convenience, although subatmospheric or superatmospheric pressures may be employed. The solvent employed is preferably an ether, and most preferably a dialkyl ether of 2 to 10 carbons or a cyclic aliphatic hydrocarbon ether such as dioxane, tetrahydrofuran, and the like. Aromatic hydrocarbon solvents, such as benzene or xylene, or ester solvents such as ethyl acetate can also be employed.

The ratio of reactants in both processes is not critical and can range from 1:10 or more to 10:1 or more, although preferably the ratio is usually about 2:1 sulfur reagent to decaborane (14).

Also produced in the second process is the anion $R_2'NNB_9H_{12}^-$. Both anions are contained in a solid mixture which forms during the reaction. Upon treating the solid with aqueous alkali-metal hydroxide (1–50 percent), e.g. sodium hydroxide, the alkali-metal salt of each anion is obtained in the aqueous layer. The aqueous solution is then treated with a solution of a compound containing a precipitation cation, e.g., tetramethylammonium chloride, whereupon the tetramethylammonium salts containing both anions precipitate. The compounds containing the two different anions can be separated by taking advantage of their different solubilities in certain solvents. For example, upon treatment with hot ethanol, the $(CH_3)_4NR_2'NNB_9H_{12}$ dissolves, leaving the ethanol-insoluble $(CH_3)_4NB_{10}H_{11}S$ in suspension. Alternatively, the mixture of salts can be dissolved in a solvent such as acetonitrile and the salts can be selectively precipitated by careful addition of a relatively poor solvent, such as ethyl ether, benzene, or chloroform.

Once the substituted ammonium salt of $B_{10}H_{11}S^-$ is obtained, any of the other cations defined by M can replace the tetramethylammonium cation by well known cation-exchange procedures. Specific cation-exchange resins can be employed, as in Examples II and III.

Alternatively, the compound $B_{10}H_{12}S$ (Example III) can be reacted with ammonia, an amine, or a hydroxide in which the cation is any of the cations described on page 1 (other than hydrogen). The exact technique of conducting the reaction and isolating the product will depend on the particular cation desired in the product and will be easily determined by one skilled in the art.

The salts of the present invention are, in general, high-melting, pale-yellow to colorless, crystalline solids that are stable with respect to water, air, and mild heating. The inner salt $B_{10}H_{12}S$, as described in Example III, can be sublimed under reduced pressure. Some of the salts are surprisingly soluble in relative nonpolar solvents; for example, the sodium, cesium, and ammonium salts are soluble in ethyl ether.

The products and processes of this invention are illustrated in further detail in the following examples.

EXAMPLE I

To a stirred solution of 20 g. of decaborane(14) in 500 ml. of ether cooled in an ice bath was added a 0.63 molar solution of N,N-thionitrosodimethylamine in ether (261 ml.) over a period of thirty minutes. The resulting red-colored mixture was stirred for an additional forty-five minutes. The ethereal solution was decanted from the gum which had separated, and the gum was washed with ether and extracted with dilute (ca. 10%) aqueous sodium hydroxide. The aqueous extract was filtered, and the filtrate was treated with tetramethylammonium chloride. The resulting precipitate was collected by filtration and washed with water. The filter cake was purified by boiling with ethanol (ca. 30 ml./g.). Filtration of the resulting hot suspension gave $(CH_3)_4NB_{10}H_{11}S$, tetramethylammonium undecahydrothiaundecaborate. Recrystallization of the crude product from acetonitrile gave (in four crops) 7.9 g. of $(CH_3)_4NB_{10}H_{11}S$.

*Analysis.*—Calcd. for $C_4H_{23}B_{10}NS$: B, 48.0; H, 10.3; C, 21.3; N, 6.22; S, 14.2; 1/2 M.W. 112. Found: B, 48.8; H, 9.92; C, 21.8; N, 6.53; S, 14.1; M.W. (ebull.).109. U.V. λ max. ($CH_3CN$) 270 mμ (ε 1320), 236 mμ (ε 2320).

The $H^1$ nuclear magnetic resonance spectrum of $(CH_3)_4NB_{10}H_{11}S$ in $CD_3CN-(CD_3)_2SO$ showed only a single peak at 7.03 τ corresponding to $(CH_3)_4N^+$. There was no resonance attributable to —SH, consistent with the previously described structure.

If salts containing other precipitating cations are substituted for tetramethylammonium chloride in essentially the procedure of Example I, the corresponding salts containing these cations and the $B_{10}H_{11}S^-$ anion can be obtained. For example, tetranaphthylphosphonium iodide gives $(C_{10}H_7)_4PB_{10}H_{11}S$, methyltetramethylenesulfonium bromide gives

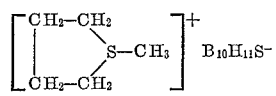

tetraphenylarsonium chloride produces $(C_6H_5)_4AsB_{10}H_{11}S$

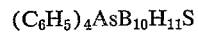

and tetramethylstibonium chloride gives $(CH_3)_4SbB_{10}H_{11}S$

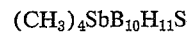

EXAMPLE II

A warm solution of 1 g. of $(CH_3)_4NB_{10}H_{11}S$ in about 75 ml. of 1:1 aqueous acetonitrile was passed through a column of sodium-ion-exchange resin. The effluent was evaporated in vacuo to a small volume and treated with excess concentrated aqueous cesium sulfate. The resulting precipitate was collected by filtration to give .89 g. of colorless $CsB_{10}H_{11}S$. The product was further purified by recrystallization from water.

*Analysis.*—Calcd. for $CsB_{10}H_{11}S$: B, 38.0; H, 3.9; S, 11.3. Found: B, 38.4; H, 4.3; S, 11.4.

The sodium-ion-exchange resin was made from a commercial, sulfonated styrene-copolymer cation-exchange resin ("Rexyn" 101 (H)) by passing aqueous sodium chloride through a column filled with the resin until the effluent was no longer acidic and then washing the resin free of chloride ion with water.

Cation-exchange resins containing other alkali metals or alkaline-earth metals in place of sodium can be made in the same way by substituting a soluble salt containing the desired cation for sodium chloride. If such cation-exchange resins are used in essentially the procedure of Example II, solutions of other alkali-metal and alkaline-earth-metal salts containing the $B_{10}H_{11}S^-$ anion can be obtained. The solid salts can be isolated by evaporation. For example, $LiB_{10}H_{11}S$, $KB_{10}H_{11}S$, $Mg(B_{10}H_{11}S)_2$, $Ca(B_{10}H_{11}S)_2$

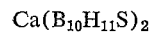

and $Ba(B_{10}H_{11}S)_2$ can be made in this way.

EXAMPLE III

An aqueous solution of 2 g. of $CsB_{10}H_{11}S$ was passed through a column of the sodium-ion-exchange resin of Example II, and the effluent was evaporated to a small volume. Addition of 10% aqueous hydrochloric acid to the solution gave a precipitate which was collected by filtration and washed with dilute hydrochloric acid to give 1.01 g. of hydrated $B_{10}H_{12}S$. Sublimation of a portion of the product at 130–170° and 0.1 mm. pressure gave $B_{10}H_{12}S$ as a waxy solid.

*Analysis.*—Calcd. for $B_{10}H_{12}S$: B, 71.0; H, 7.94; S, 21.1. Found: B, 70.0; H, 8.07; S, 21.0.

Platinum-catalyzed acid hydrolyses of $B_{10}H_{12}S$ gave 2935 cc. and 2937 cc. of hydrogen per gram of compound. This is consistent with the following equation:

$$B_{10}H_{12}S + 30H_2O \rightarrow 10B(OH)_3 + H_2S + 20H_2$$

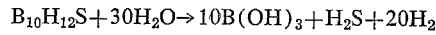

Theory for this equation is 2940 cc. of hydrogen per gram of compound.

The compound $B_{10}H_{12}S$ can also be written as $HB_{10}H_{11}S$ and can be considered as having an inner-salt or Zwitterion structure. The twelfth hydrogen probably occupies a bridge or a terminal position. Treatment of $B_{10}H_{12}S$ with a base removes the proton and $B_{10}H_{11}S^-$ reforms.

EXAMPLE IV

To excess concentrated ammonium hydroxide solution was added .30 g. of $B_{10}H_{12}S$. The resulting solution was evaporated to dryness to give .32 g. of $NH_4B_{10}H_{11}S$ as a colorless solid. Analysis indicated that the salt was obtained as a hemihydrate.

*Analysis.*—Calcd. for $B_{10}H_{15}NS$-$1/2H_2O$: B, 60.6; H, 9.05; N, 7.85; S, 18.0. Found: B, 60.6; H, 8.90; N, 8.09;- S, 17.0.

The unhydrated ammonium salt can be obtained by the reaction of anhydrous ammonia with $B_{10}H_{12}S$ in ether solution.

By the general cation-exchange procedure described previously, salts containing other cations in combination with the $B_{10}H_{11}S$ anion can be obtained by substituting the appropriate hydroxide for ammonium hydroxide in essentially the method of Example IV. If the hydroxide is derived from a volatile amine as is, for example, dimethyl-ammonium hydroxide, an unmeasured excess can be used and the unreacted base removed by evaporation. Otherwise an equivalent amount of hydroxide is used and the product is obtained by evaporation. By this method, there can be made compounds such as $RbB_{10}H_{11}S$,
$Sr(B_{10}H_{11}S)_2$,
$C_2H_5NH_3B_{10}H_{11}S$,
$(C_6H_{11})_2NH_2B_{10}H_{11}S$,
$(CH_3)_3NHB_{10}H_{11}S$,
$C_6H_5CH_2(CH_3)_3NB_{10}H_{11}S$,
$(CH_3)_4PB_{10}H_{11}S$,
$(C_2H_5)_3SB_{10}H_{11}S$,
$(C_4H_9)_4AsB_{10}H_{11}S$, and $(C_3H_6)_4SbB_{10}H_{11}S$.

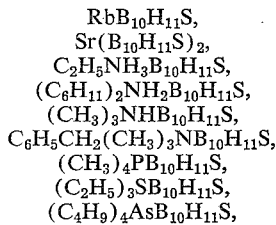

EXAMPLE V

To a solution of 1 g. of $B_{10}H_{12}S$ in ether was added anhydrous triethylamine. The resulting precipitate was collected by filtration and washed with ether to give 1.49 g. of $(C_2H_5)_3NHB_{10}H_{11}S$ as a colorless solid.

*Analysis.*—Calcd. for $B_{10}H_{27}C_6NS$: B, 42.7; H, 10.7; C, 28.4; N, 5.53; S, 12.7. Found: B, 39.0; H, 10.7; C, 28.4; N, 5.54; S, 10.5.

The ultraviolet spectrum of the product in acetonitrile shows absorption at 272 mμ (ε1360) and 238 mμ (ε 2080).

Other substituted ammonium salts can be obtained by substituting the appropriate amines for triethylamine in the procedure of Example V. For example, aniline gives $C_6N_5NH_3B_{10}H_{11}S$, morpholine gives $$O(CH_2CH_2)_2NH_2B_{10}H_{11}S$$

and dimethyloctadecylamine gives $$C_{18}H_{37}(CH_3)_2NHB_{10}H_{11}S.$$

EXAMPLE VI

To a filtered solution of 3.66 g. of decaborane (14) in 100 ml. of ether cooled to 10° was added 5.22 g. of di-t-butyl sulfur diimine. An orange color appeared. The solution was allowed to stand at room temperature for 18 hours during which time a precipitate formed and then dissolved again. The resulting solution was evaporated to a dark oil which was washed with pentane and then extracted with about 150 ml. of 10% aqueous sodium hydroxide solution. The alkaline extract was filtered, and the filtrate was treated with excess solid tetramethylammonium chloride. The resulting precipitate was collected by filtration to give 5.06 g. of solid material, the infrared spectrum of which was nearly the same as that of authentic $(CH_3)_4NB_{10}H_{11}S$. The product was further purified by washing with warm ethanol and recrystallizing the undissolved solid from acetonitrile to give 1.35 g. of $(CH_3)_4NB_{10}H_{11}S$. The infrared spectrum of the product was identical to that of the $(CH_3)_4NB_{10}H_{11}S$ produced in Example I.

The $R'_2NNS$ reactant can be prepared by reacting 1,1-dialkylhydrazine, e.g., 1,1-dimethylhydrazine with powdered sulfur at temperatures of 0° to 50° C. in an inert medium such as ether. The $R'_2NNS$ can then be isolated by ordinary methods, e.g., distillation or recrystallization.

The $RN=S=NR$ reactant can be prepared as described in Angew. Chem 68, 678 (1956) and J. Org. Chem. 26, 3476 (1961).

The compounds of this invention are useful as reducing agents, e.g., they reduce silver nitrate to metallic silver and palladium chloride to metallic palladium. They are therefore useful in the manufacture of printed circuits in electrical and electronic equipment. They are also useful in the preparation of electrical resistors. For example, a cotton string can be impregnated with a nearly saturated solution of a compound of the invention, e.g., $(CH_3)_4NB_{10}H_{11}S$, in a volatile solvent. The string is then removed from the solution, dried, and burned to yield a coherent ash which in size and shape resembles the original string. This residual ash is of sufficient coherence to permit embedding in paraffin and is a useful electrical resistor. Resistors of 1,200,000 ohms/mm. can be prepared in this manner.

$B_{10}H_{12}S$ is also useful as a copolymerizable compound with isocyanides. For example:

To a solution of .1 g. of $B_{10}H_{12}S$ in acetonitrile was added benzyl isocyanide until precipitate formation ceased. Filtration gave 0.5 g. of black polymer.

*Analysis.*—Calc'd. for $B_{10}H_{12}S \cdot 32(C_8H_7N)$: B, 2.78; H, 6.1; N, 11.5; C, 78.7. Found: B, 2.75; H, 6.22; N, 11.5; C, 78.8.

The analysis is consistent with a 32:1 copolymer of benzyl isocyanide and $B_{10}H_{12}S$.

And additionally:

To a solution of a small sample of $B_{10}H_{12}S$ in acetonitrile was added cyclohexyl isocyanide until formation of precipitate ceased. The precipitate was collected by filtration and rinsed with acetonitrile to give a tan polymer. Evaporation of the filtrate gave additional polymer as a brittle tan film.

*Analysis.*—Found: B, 3.49; H, 10.36; N, 12.1; C, 73.9.

This analysis is consistent with a 27:1 copolymer of cyclohexyl isocyanide and $B_{10}H_{12}S$.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound of the formula $$MB_{10}H_{11}S$$

wherein M is hydrogen, alkali metal, one equivalent of an alkaline-earth metal, ammonium, $GNH_3^+$, $GG'NH_2^+$, $GG'_2NH^+$, $GG'_3N^+$, $G_4P^+$, $G_3S^+$, $G_4As^+$, and $G_4Sb^+$, wherein G is an aliphatically saturated hydrocarbon group of up to 18 carbon atom, G' is an aliphatically saturated hydrocarbon group of up to 18 carbon atoms that is bonded to the N through an aliphatic carbon, and wherein any two G and G' groups can be joined to form a divalent group of up to 18 carbon atoms selected from the class consisting of aliphatically saturated hydrocarbon and aliphatically saturated mono-oxahydrocarbon.

2. $B_{10}H_{12}S$.
3. $(CH_3)_4NB_{10}H_{11}S$.
4. $CsB_{10}H_{11}S$.
5. $NH_4B_{10}H_{11}S$.
6. $(C_2H_5)_3NHB_{10}H_{11}S$.
7. Process comprising reacting decaborane(14) with a sulfur diimine of the formula $RN=S=NR$ wherein R is alkyl of 4–12 carbon atoms or aryl of 6–10 carbon atoms, at a temperature of between about —25° and 50° C. in the presence of an inert solvent, and recovering a compound containing $B_{10}H_{11}S^-$ anions.

References Cited

UNITED STATES PATENTS

| | | | |
|---|---|---|---|
| 3,050,361 | 8/1962 | Muetterties | 260—606.5 |
| 3,149,163 | 9/1964 | Knoth | 260—606.5 |

EARL C. THOMAS, *Primary Examiner.*

HOKE S. MILLER, *Assistant Examiner.*

U.S. Cl. X.R.

23—357, 358, 362; 260—606.5